(12) United States Patent
Reed

(10) Patent No.: US 11,424,820 B2
(45) Date of Patent: Aug. 23, 2022

(54) ULTRA-LOW LATENCY TELECOMMUNICATIONS SATELLITE

(71) Applicant: Airbus Defence and Space Limited, Stevenage (GB)

(72) Inventor: Jaime Reed, Stevenage (GB)

(73) Assignee: AIRBUS DEFENCE AND SPACE LIMITED, Stevenage (GB)

( * ) Notice: Subject to any disclaimer, the term of this patent is extended or adjusted under 35 U.S.C. 154(b) by 0 days.

(21) Appl. No.: 16/485,000

(22) PCT Filed: Feb. 7, 2018

(86) PCT No.: PCT/EP2018/053109
§ 371 (c)(1),
(2) Date: Aug. 9, 2019

(87) PCT Pub. No.: WO2018/146164
PCT Pub. Date: Aug. 16, 2018

(65) Prior Publication Data
US 2019/0386736 A1 Dec. 19, 2019

(30) Foreign Application Priority Data
Feb. 10, 2017 (EP) .................................. 17275016

(51) Int. Cl.
*H04W 72/04* (2009.01)
*H04B 7/185* (2006.01)

(52) U.S. Cl.
CPC ....... *H04B 7/18526* (2013.01); *H04B 7/1856* (2013.01); *H04B 7/18508* (2013.01); *H04B 7/18519* (2013.01)

(58) Field of Classification Search
CPC ............ H04B 7/18526; H04B 7/18508; H04B 7/18519; H04B 7/1856; H04B 7/18504
See application file for complete search history.

(56) References Cited

U.S. PATENT DOCUMENTS 4,506,383 A * 3/1985 McGann ............ H04B 7/18528
455/13.1
5,233,604 A 8/1993 Ahmadi et al.
(Continued)

FOREIGN PATENT DOCUMENTS

CN 101299713 11/2008
CN 101517923 8/2009
(Continued)

OTHER PUBLICATIONS

High Altitude Platform Station (HAPS): A Review of New Infrastructure Development for Future Wireless Communications. Anggoro K. Widiawan and Raham Tafazolli Wireless Personal Communications (2007) 42:387-404 (Year: 2007).*
(Continued)

*Primary Examiner* — Hassan Kizou
*Assistant Examiner* — Mahbubul Bar Chowdhury
(74) *Attorney, Agent, or Firm* — Dority & Manning, P.A.

(57) ABSTRACT

According to the present invention, there is provided a signal routing method, performed by a processing module, for configuring transmission of a signal through a communications constellation comprising a plurality of assets, comprising: receiving an instruction to transmit a signal from a transmitter ground station associated with the processing module to a receiver ground station via the communications constellation, requesting and obtaining connection data from a network management module defining the available connections between assets in the communications constellation, determining, using the obtained connection data, a sequence of a plurality of assets representing an optimum route through the communications constellation for transmission of the signal from the transmitter ground station to the receiver ground station, and transmitting the signal from the processing module to the transmitter ground station.

10 Claims, 2 Drawing Sheets

(56) References Cited

U.S. PATENT DOCUMENTS

| | | | |
|---|---|---|---|
| 5,526,404 A * | 6/1996 | Wiedeman | H04B 7/18556 244/158.4 |
| 5,586,165 A | 12/1996 | Wiedeman | |
| 5,740,164 A * | 4/1998 | Liron | H01Q 1/242 370/316 |
| 5,825,325 A * | 10/1998 | O'Donovan | H04B 7/18521 342/353 |
| 6,195,553 B1 * | 2/2001 | Claffery | H04L 45/12 455/445 |
| 6,553,226 B1 * | 4/2003 | Watson | H04B 7/18521 370/316 |
| 6,560,450 B1 * | 5/2003 | Rosenberg | H04B 7/18584 455/316 |
| 6,567,645 B1 | 5/2003 | Wiedeman et al. | |
| 6,609,002 B1 | 8/2003 | Krishnamurthy et al. | |
| 7,680,040 B2 * | 3/2010 | Thesling | H04L 27/0008 370/230 |
| 8,780,928 B2 | 7/2014 | Natarajan et al. | |
| 9,057,774 B2 | 6/2015 | Silny et al. | |
| 9,094,856 B1 * | 7/2015 | Tian | H04B 7/18584 |
| 2003/0046633 A1 * | 3/2003 | Jutzi | H04L 1/0618 714/774 |
| 2011/0216760 A1 * | 9/2011 | Murphy | H04L 12/66 370/352 |
| 2013/0077562 A1 * | 3/2013 | Boltz | H04B 7/18534 370/316 |
| 2015/0280810 A1 * | 10/2015 | Beals | H04W 40/20 455/13.1 |
| 2016/0037434 A1 * | 2/2016 | Gopal | H04L 45/02 370/316 |
| 2016/0094288 A1 * | 3/2016 | Krebs | H04B 7/18521 455/12.1 |
| 2018/0084476 A1 * | 3/2018 | Kay | H04B 7/195 |
| 2018/0098248 A1 * | 4/2018 | Torres | H04L 47/762 |
| 2018/0227043 A1 * | 8/2018 | Dankberg | H01Q 1/288 |

FOREIGN PATENT DOCUMENTS

| | | |
|---|---|---|
| CN | 102932050 | 2/2013 |
| CN | 103685025 | 3/2014 |
| CN | 104767559 | 7/2015 |
| CN | 104901950 | 9/2015 |
| CN | 106059650 | 10/2016 |
| FR | 2796229 | 2/2003 |
| WO | WO 2017/023621 | 2/2017 |

OTHER PUBLICATIONS

The Coverage Analysis for Low Earth Orbiting Satellites at Low Elevation. Shkelzen Ckaj, Bexhet Kamo, Algenti Lala and Alban Rakipi. (IJACSA) International Journal of Advanced Computer Science and Applications vol. 5, No. 6, 2014. (Year: 2014).*

Igh Altitude Platform Station (HAPS): A Review of New Infrastructure Development for Future Wireless Communications. Anggoro K. Widiawan and Raham Tafazolli Wireless Personal Communications (2007) 42:387-404 (Year: 2007) (Year: 2007).*

The Coverage Analysis for Low Earth Orbiting Satellites at Low Elevation. Shkelzen Ckaj, Bexhet Kamo, Algenti Lala and Alban Rakipi. (IJACSA) International Journal of Advanced Computer Science and Applications vol. 5, No. 6, 2014. (Year: 2014) (Year: 2014).*

Handover management in Low Earth Orbit (LEO) satellite networks.— Ian F. Akyildiz, Huseyin Uzunalioglu and Michael D. Bender— Mobile Networks and Applications 4, 301-310 (1999) (Year: 1999).*

Of A Shortest Path Algorithm based on Mobile Agent in LEO Satellite Network—Xiang-Jun Dong and Hao-Shan Shi—2008 4th International Conference on Wireless Communications—Oct. 12-14, 2008 (Year: 2008).*

International Search Report and Written Opinion from PCT/EP2018/053109, dated May 8, 2018, 19 pages.

Malinowski et al., "High Altitude Platform—Future of Infrastructure", International Journal of Electronics and Telecommunications, vol. 56, No. 2, Jun. 1, 2010, pp. 191-196.

International Preliminary Report on Patentability, dated Aug. 22, 2019, 13 pages.

Chinese Examination Report for Corresponding Patent Application No. CN 201880011328, dated Apr. 21, 2021—9 pages.

English translation of Japanese Office Action for corresponding Japanese Application No. 2019-542496, dated Nov. 29, 2021, 4 pages.

* cited by examiner

ULTRA-LOW LATENCY TELECOMMUNICATIONS SATELLITE

TECHNICAL FIELD

The present invention relates to an ultra-low latency telecommunications system, and particularly, but not exclusively, to routing of signals through a communications constellation comprising satellites configured in a Low Earth Orbit, LEO, and/or high altitude platforms, operable in a repeater configuration.

BACKGROUND OF INVENTION

There is a growing need for fast communication across the globe. Where long-distance communication is required, for example between stock exchanges in London, New York and Tokyo, the latency associated with a particular signal transmission configuration can be problematic, since it becomes difficult to synchronise data processing activities in each location. In the case of an algorithmic high frequency trading application, for example, such latency can have significant impacts on the efficiency of the trading process and the outcomes of decisions which are taken on particular stock trades.

Conventionally, such long-distance communication has been carried out using optical fibre links which, although faster than copper cables, are associated with the disadvantage that the speed of light through a particular optical fibre cable is lower than in free space. In pursuit of increased communication speed, communications systems exist in which microwave link networks are used instead, in which point-to-point microwave links are established between fixed terrestrial locations such as towers. However, microwave links are, at present, only feasible over relatively short distances, for example between London and Frankfurt, which leaves fibre optic cables as the only option for longer links.

Accordingly, there is a need to connect remote locations with a lower latency than seen in optical fibres, while overcoming the restrictions of conventional microwave links.

SUMMARY OF INVENTION

According to the present invention, there is provided a signal routing method, performed by a processing module, for configuring transmission of a signal through a communications constellation comprising a plurality of assets, comprising: receiving an instruction to transmit a signal from a transmitter ground station associated with the processing module to a receiver ground station via the communications constellation, requesting and obtaining connection data from a network management module defining the available connections between assets in the communications constellation, determining, using the obtained connection data, a sequence of a plurality of assets representing an optimum route through the communications constellation for transmission of the signal from the transmitter ground station to the receiver ground station, and transmitting the signal from the processing module to the transmitter ground station for transmission to the first asset of the determined sequence of the plurality of assets, wherein types of assets of the communications constellation comprise satellites configured in a Low Earth Orbit, LEO, and/or high altitude platforms, HAPs, wherein the assets comprise inter-asset links operating in a repeater mode.

The method may further comprise the processing module performing packetizing, framing and modulation operations to prepare the signal for transmission through the communications constellation.

Transmitting the signal from the processing module to the ground station may comprise transmission via one or more terrestrial network nodes using microwave transmission, or any other suitable means. This may enable the signal to be transmitted from the processing module in a manner which enables it to be transmitted into the communications constellation at an optimum terrestrial location which need not be the same as the location of the processing module.

Obtaining the connection data may comprise obtaining position data defining the positions of the assets and determining available connections between the assets based on relative position data for the assets.

The position data may be obtained from predetermined information defining the configuration of the communications constellation over a predetermined period of time, and/or real-time positions of the assets, and the determining of an optimum route may be performed in a manner which takes into account variation of the communications constellation configuration with time, such that the optimum route is switched in response to variations in asset positions.

Obtaining the connection data may comprise obtaining information defining line-of-sight connectivity between assets and signal transmission characteristics existing between assets having line-of-sight connectivity.

The signal transmission characteristics may represent interference and/or meteorological influences, allowing modification or an optimum route or frequency switching to ensure that optimum transmission is performed.

The optimum route may represent one or more of the shortest path length and/or latency between the transmitter ground station and the receiver ground station, the highest signal strength or signal to noise ratio which can be provided to the receiver ground station, the lowest number of satellites in a path between the transmitter ground station and the receiver ground station, and a sequence of assets in which the number of assets able to operate in a repeater configuration is maximised and the number of assets required to operate in a regenerative configuration is minimised.

The types of assets in the determined sequence of assets in the optimum route may be determined in dependence upon the distance between the assets in the sequence, making use of the respective advantages of the different types of assets in the constellation.

The method may further comprise determining a plurality of optimum routes for transmission of signals associated with a respective plurality of frequency channels.

The method may further comprise determining a plurality of optimum routes for transmission of a signal and determining signal weightings to be applied to communication across each of the plurality of optimum routes, and transmitting the weightings to the network management module for control of the communications constellation. This solution might be particularly appropriate where different signals, or portions of those signals are to be transmitted to multiple destinations.

According to another aspect of the present invention, there is provided a telecommunications modem comprising a processing module, the telecommunications modem comprising a signal transmitter for transmitting information to a transmitter ground station, and means for communicating with a network management module, wherein the processing module is arranged to execute computer-implementable instructions to control the telecommunications modem to perform the above method.

According to another aspect of the present invention, there is provided an asset for use in a communications constellation, comprising a communications means for repeating a received signal for transmission to a further asset, wherein the asset is a satellite configured for use in a Low Earth Orbit.

The asset may be a high altitude platform and may be configured for operation at an elevation of 2°-3° above a transmitter ground station, maximising coverage of transmitter and receiver ground stations, and/or a satellite may be configured for operation at an elevation of 5° above a transmitter ground station.

According to another aspect of the present invention, there is provided a network management module for controlling a communications constellation comprising a plurality of assets wherein the assets comprise satellites configured in a Low Earth Orbit, LEO, and/or high altitude platforms, HAPs, the network management module comprising means for providing connection data defining the available connections between assets in the communications constellation to a processing module in response to a request for said connection data from the processing module, and means for controlling a plurality of assets of the communications constellation to repeat and forward information to each other. The network management module is capable of commanding the communications constellation payloads into any particular required configuration (e.g. which antennas are switched on at any particular time), via a suitable ground control system which enables a communications link to be established with the communications constellation.

Using the techniques of the present invention, it is possible to transmit information in free space, at the speed of light in a vacuum (referred to as $c_0$) over a network of transceivers which are arranged to avoid large diversions from the optimal route. Consequently, latency can be reduced significantly, compared with existing terrestrial links. Additionally, by operating satellites and/or high altitude platforms with inter-asset links in a transparent configuration, namely a bent-pipe configuration in which signals are simply repeated rather than processed, processing delays that would otherwise be introduced by regenerative network nodes can be avoided, which further reduces latency.

BRIEF DESCRIPTION OF DRAWINGS

Embodiments of the present invention will be described below by way of example only, with reference to the accompanying drawings, in which.

DETAILED DESCRIPTION

Figure 1:
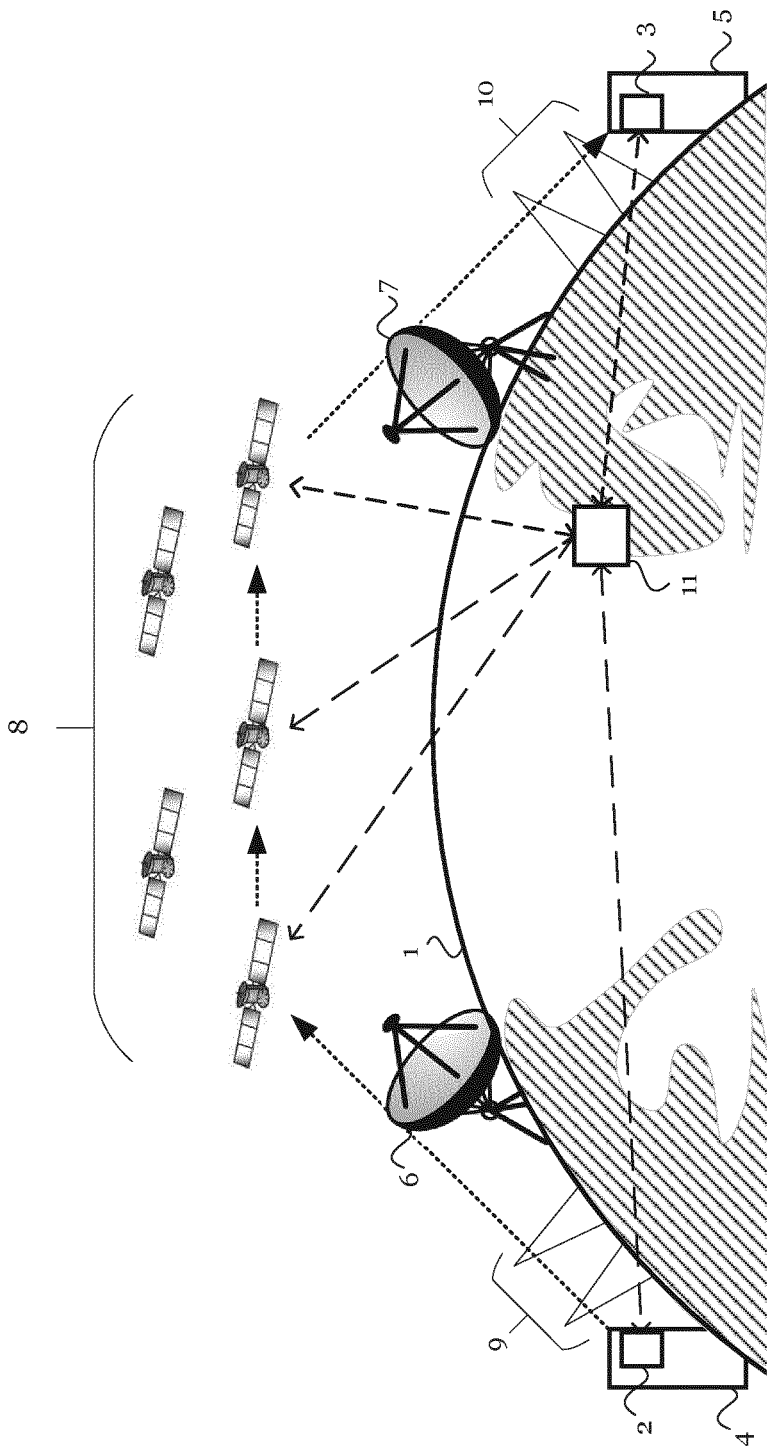
FIG. 1 illustrates an example of a communications system used in the method of embodiments of the present invention.

FIG. 1 illustrates an example of a communications system used in the method of embodiments of the present invention. Communication is to be performed between a transmitter network node and a receiver network node at any relative location on the Earth 1, as illustrated by dotted lines. In the example of FIG. 1, the curvature of the Earth 1 is illustrated to represent the transmitter network node and the receiver network node being positioned on opposite sides of the Earth, but it will be appreciated that this is simply an example. The terms "transmitter" and "receiver" are also intended to assist in the definition of a one-way communication operation, but it will be appreciated that each of the transmitter and receiver network nodes may be configured as transceivers for two-way operation by the introduction of receiver network node functionality into a transmitter network node, and vice versa.

In the configuration illustrated in FIG. 1, the transmitter and receiver network nodes are each associated with processing modules 2, 3 which are located in respective devices 4, 5 such as telecommunication modems, or routers, or in devices such as gateways or network interfaces. Such devices 4, 5 are referred to herein as "points of presence" (PoPs), which represent interfaces to a terrestrial communications system associated with, for example, a financial institution such as a stock exchange.

The processing modules 2, 3 are responsible for signal processing to translate information to be communicated into a form suitable for signal transmission and reception according to a particular communication protocol. Such signal processing can include packetization, framing and modulation, and routing. The processing modules 2, 3 take the form of hardware and/or software, as either standalone systems or components which are integrated into more complex systems associated with other functionality of the respective PoP 4, 5. The transmitter processing module 2 operates to execute computer-implementable instructions to cause the method shown in FIG. 2 to be implemented.

Signal transmission is performed from a transmitter ground station 6 or teleport to a receiver ground station 7 or teleport, via a subset of satellites in a satellite communications constellation 8. Not all of the satellites need be used in the transmission. The transmitter ground station 6 may be co-located with the transmitter PoP 4, and may be integrated into a system containing the processing module 2, but in the configuration illustrated in FIG. 1, the transmitter ground station 6 is located remotely from the transmitter PoP 4, and communication between the transmitter PoP 4 and the transmitter ground station 6 is performed via a terrestrial link 9 such as a microwave link. The receiver ground station 7 is similarly illustrated as connected to the receiver PoP 5 via a terrestrial microwave link 10, but may be located locally at the receiver PoP 5.

The communications constellation 8 contains a plurality of assets, each of which may be positioned at a fixed location, or may be in orbit around the Earth 1. Each asset is free to move independently of other assets in the communications constellation 8. The assets are co-ordinated and controlled from the ground by a network management module 11, the control links illustrated by dashed lines. The control links are implemented via a suitable ground control system relaying control signals to the communications constellation 8 via a transmission/reception ground station The network management module 11 is arranged in hardware and/or software, and comprises a processor and a storage means for processing and storing information relating to the communications constellation, transmitting such control information to the communications constellation 8, and receiving status or diagnostic information assets in the communications constellation 8. The network management module 11 has an interface for communicating with both the transmitter and receiver processing modules 2, 3, those links illustrated in FIG. 1 in dotted lines. The links to the processing modules 2, 3 may be terrestrial such as internet links, and need not be routed through the communications constellation 8, but in modifications of these embodiments, the network management may transmit and receive information through the communications constellation via an antenna.

In the presently-described embodiment, the assets are represented by LEO satellites. LEO satellites orbit at an altitude of 7-1,400 km above the Earth. In addition to uplink and downlink capabilities, the satellites comprise inter-satellite radio frequency (RF) links operating in a repeater (bent-pipe) mode which does not involve regenerative signal processing, and in which the inter-satellite links perform signal transmission in free space, at $c_0$, consequently enabling a lower latency than fibre optic links. It should be noted that although the current disclosure describes RF signals it may also apply equally to laser signal transmission. Specifically, a bent-pipe repeater represents a simplified payload architecture and involves detecting a radio frequency (RF) signal, up-converting or down-converting the RF signal and retransmitting it, but without regenerating the signal through e.g. amplification, re-modulation and error correction. The up/down-conversion may facilitate particular point-to-point communication based on environmental conditions and/or the location of the satellites, such as the frequencies of interference sources in the region of particular satellites. A satellite operating in a bent-pipe mode can thus be considered as operating in a transparent configuration, in contrast to a regenerative configuration in which signal processing involving coding or modulation of the data is performed.

The satellites are able to act as one or more intermediate nodes between a ground station and a ground station, between a first satellite to a second satellite, and between a ground station and a satellite. In an example configuration, although not all satellites are shown, there are of the order of 100-150 satellites in the constellation in a low earth orbit, distributed about the Earth, and each can operate at low angles of elevation, (for example, as low as 5° relative to a ground station), to maximise coverage. In alternative implementations, there may be more or fewer satellites, as required.

In a signal transmission operation, the processing module 2 of the transmitter PoP 4 receives a request from, for example, the financial institution, to transmit particular information, and performs processing of the information to be transmitted into a signal suitable for transmission to the receiver PoP 5. In addition, the processing module 2 of the transmitter PoP 4 performs a routing operation according to embodiments of the present invention to determine an optimum route through the network to connect the transmitter ground station 6 to the receiver ground station 7.

The optimum route represents one or more of:
- the lowest latency;
- the shortest physical path length between the transmitter ground station and the receiver ground station;
- the highest signal strength which can be provided to the receiver ground station;
- the highest signal to noise ratio of a signal provided to the receiver ground station;
- the lowest number of satellites in a path between the transmitter ground station and the receiver ground station; and
- a sequence of satellites in which the number of satellites able to operate in a repeater configuration is maximised and the number of satellites required to operate in a regenerative configuration is minimised.

It will be appreciated that the optimum route may vary with time for a number of different reasons, to be described below, and so the processing module 2 is configured to be able to determine an optimum route on a dynamic basis.

In order to determine an optimum route, the processing module 2 requests information relating to the connectivity between satellites in the communications constellation 8. Such information is available from the network management module 11 which co-ordinates the communications constellation 8. The connectivity information may be represented in a schedule defining those satellites which can be connected to a neighbouring satellite at a particular instant in time, or a period of time, or may be inferred by the processing module 2 from tracking information defining the positions of the satellites, provided by the network management module 11. The connectivity may be represented by the existence of a line of sight between two neighbouring satellites, but in alternative embodiments, connectivity may be determined based on satellites being separated by a distance equal to or less than a maximum range of transmission, or by determining an ability to communicate in an environment containing other communications links in the same or other constellations.

On receipt of connectivity information from the network management module 11, the processing module 2 generates a three-dimensional model of satellite positions at particular instants in time and applies an optimisation algorithm, such as a spatial routing algorithm, to the model to plot an optimum route through the communications constellation 8 based on a satellite or sequence of satellites which provides connectivity from the transmitter ground station 6 to the receiver ground station 7. Signal transmission from the transmitter ground station 6 to the receiver ground station 7 is performed in response to completion of the optimisation algorithm.

The optimum route may be the only available route at a particular time, or may be selected from a plurality of different routes.

In alternative embodiments, the processing module 2 predicts satellite positions at a particular instant in the future, based on information defining the motion of the satellites and their orbital paths, as received from the network management module 11, where transmission is to be deferred until a specific point in time in the future.

In cases where the optimum route is that which is associated with lowest latency, latency can be predicted using mathematical calculation, based on the physical path length through the communications constellation 8 and the throughput/delays of the signal through the system. The estimate of latency may be modified in cases where regenerative satellites are included in the optimum route, so as to allow for delays caused by processing at those regenerative satellites.

The optimum route may alternatively be selected based on the number of satellites in a route from the transmitter ground station 6 to the receiver ground station 7. Specifically, the optimum route may be that which contains the lowest number of satellites. It will thus be appreciated that it is not essential for the optimum route to be that which is associated with the lowest latency, since a preferred route might be one associated with improved performance through reduction in the number of frequency conversion and repeater operations which are to be performed along the link, where the expected latency can be tolerated.

In some embodiments of the present invention, the processing module 2 is able to take into account environmental conditions, for example, using meteorological information available from the network management module 11, or a dedicated meteorological information server (not shown). In cases where the physical positioning and connectivity of satellites would suggest that a particular communications route may be optimal, it may that the presence of a storm on that route causes signal loss or electromagnetic interference, such that in practice, it is not in fact the optimum route.

In some embodiments of the present invention, the processing module 2 is able to consider the effect of external signal interference on a particular route through the communications constellation 8. It will be appreciated that different routes may experience different levels of interference, based on the presence of other conflicting satellite constellations, and that the degree of severity of interference may vary. If interference is predicted to be high, based on expected traffic over a particular geographical area at a particular time, it will be appreciated that even if a route through the communications constellation 8 which passes over that geographical area might be associated with optimal parameters, such as minimum path length, it may not necessarily lead to high performance from the perspective of a high signal to noise ratio, or an absolute signal strength. The optimum route can therefore be determined by the processing module 2 to be one which can be expected to provide the receiver ground station with the highest signal to noise ratio, or the highest absolute signal level, In these embodiments, interference is predicted using information provided from the network management module 11 relating to factors external to the communications constellation 8 from which signal loss can be estimated. The network management module 11 controls frequency up-conversion and down-conversion operations of satellites in the communications constellation 8 accordingly in order to avoid interfering signals. In some embodiments, detection of interfering signals can be reported to the network management module 11 by each satellite in real-time, while it is also possible for interference to be predicted based on the number of assets in a particular geographical region at a particular time. The processing module 2 is able to access this information from the network management module, and integrate optimal frequency switching schemes into the routing algorithm. For example, the algorithm may be able to maintain a physical transmission route which maintains the shortest physical path length if frequency shifting is employed to avoid interference. On the contrary, an alternative transmission route may be selected if frequency shifting is not possible due to a large number of interference sources on the optimum route.

Having determined the effects of interference as above, it may be that it is not in fact necessary to re-route a signal to avoid such interference, and modification of the signal transmission scheme, such as inclusion of additional error-correction codes or encryption, enables a signal to be sufficiently robust to travel through an interference region, such that an otherwise optimum route can be maintained, taking into account the calculated delays in the network from additional processing.

The interference and meteorological condition information may be referred to herein as examples of signal transmission characteristics.

It is not essential for all of the satellites in the communications constellation 8 to operate in a repeater configuration. It is possible for some satellites to operate in a regenerative configuration where this is required due to, for example certain constraints such as environmental conditions or a temporary lack of availability of adjacent satellites within a particular range. Regenerative satellites may represent gateways at which route-switching operations can be performed.

In such circumstances, the optimum route might be a route which maximises the number of satellites in a sequence of satellites which can route a signal in a repeater configuration, and which minimises the number of satellites which operate in a regenerative configuration. This optimisation can reduce overall latency.

As set out above, it is desirable to maximise the number of satellites operating in a repeater configuration in order to enable latency to be reduced. Where satellites are operating in repeater configuration, the satellites do not themselves require the capability to perform on-board processing in order to make signal routing decisions, and this renders the performance of such signal routing by the processing module 2 to be advantageous in this context.

Having transmitted a signal from the transmitter ground station 6 to a first satellite in a sequence of satellites representing an optimum route through the communications constellation 8, the first satellite is configured, by virtue of its orbit around the Earth, to have connectivity to a particular second satellite at a particular time, dependent on the orbit of the second satellite. As such, the timing of the transmission of the signal to the first satellite determines the second satellite to which the first satellite repeats the signal, particularly in cases where the first satellite operates in a transparent repeater configuration which does not make its own signal routing determinations. Similarly, the timing of transmission of the signal to the second satellite will in turn determine a third satellite to which the second satellite repeats the signal, particularly in cases where the second satellite operates in a transparent repeater configuration which does not make its own signal routing determinations.

In cases where none of the satellites in a route through the communications constellation 8 comprises on-board processing for signal routing, it thus follows that particular routes through the communications constellation 8 are associated with a respective first satellite of a sequence of satellites, and the consequence of determination of an optimum route is the transmission of a signal to an optimum first satellite by the transmitter ground station 6.

It will be appreciated that in circumstances where the transmitter PoP 4 is in connection with a plurality of different transmitter ground stations 6, the processing module 2 can extend the optimisation algorithm to consider the optimum transmitter ground station which should be used to transmit the signal to the communications constellation 8, based on the optimum first satellite, such that transmission from the PoP 4 is itself controlled on the basis of optimisation of a signal route.

In a modification of the example set out above, it may be that the configuration of the communications constellation is such that a first satellite has connectivity with a plurality of second satellites at a particular time, dependent on the orbits of the satellites in the communications constellation 8. In cases where the first satellite is operating in a repeater mode, the first satellite is not required to be able to make a determination or selection as to which of the second satellites should receive a signal from the first satellite, and so the first satellite may transmit the signal to each of the plurality of second satellites. The same principle would apply at subsequent satellites in the communications constellation 8. It is thus clear that in this configuration, the signal is able to reach the receiver ground station via multiple parallel routes, such that the receiver receives multiple signals. In this situation, the processing module 3 associated with the receiver PoP 5 is configured to extract the signal, of multiple received signals, which has been transmitted over the optimum route.

The receiver processing module 3 may, for instance, distinguish signals received by the receiver ground station 7 from different satellites, representing the final satellites along respective transmission routes, and in this case, the final satellite in the route, namely the satellite providing a downlink to the receiver ground station 7, is indicative of a particular transmission route.

Where more complex transmission routes exist through the communications constellation 8, based on permutations of inter-satellite links, it is possible that the identity of the final satellite alone is not sufficient to identify a transmission route, for example where multiple transmission routes through the constellation converge prior to the downlink. Since the inter-satellite links of the satellites operate in a bent-pipe mode, they do not introduce any information into the transmission signal which defines the transmission route, meaning the transmission route cannot be determined from the received signal alone.

In some embodiments, however, the transmission route can be identified from particular weighting schemes which are applied to signal transmission at each satellite by the network management module 11 as described below.

In addition to controlling and tracking the orbit of satellites in the communications constellation 8, the network management 11 module can, in some embodiments, impose a particular routing constraint on satellites in circumstances where the satellite has available connectivity to two or more other satellites at a particular instant in time. For example, the network management module might control a satellite to re-transmit 75% of a received signal to one of the available destination satellites, and only 25% of the received signal to another available destination satellite. The weighting is determined by the processing module 2 of the transmitter PoP 4 as part of the optimisation algorithm, and provided to the network management module 11. It will be appreciated that such weightings or control signals could equally apply to use of the bandwidth allocation so that the eventual signal separation may be performed by filtering at the receiver.

Such a weighting scheme does not require any additional level of signal processing to be applied by the transmitting satellite since the content of the signal is unchanged aside from its amplitude or frequency, and consequently it is possible for a satellite to split an incoming signal while operating in a bent-pipe mode. The signal weighting scheme may be provided to a processing module 3 in a receiver PoP 5 either by the network management module 11, or directly from the processing module 2 of the transmitter PoP 4, and based on received signal amplitude/frequency, a signal transmission route can be identified by the receiver processing module 2. Correspondingly, a signal level of a plurality of received signals which has the highest amplitude can be identified as having been transmitted through the path having the highest product of weighting factors, for example, and as described above, this may represent the optimum transmission route in some embodiments.

The embodiments above are described in connection transmission of a single signal from a transmitter ground station 6 to a receiver ground station 7, but it will be appreciated that it is also possible for multiple signals to be transmitted, using a multiplexing scheme. In this configuration, the processor module 2 at the transmitter PoP 4 determines whether it is appropriate or possible to multiplex multiple signals into a single transmission across the same optimum route through the communications constellation 8, using, for example, well-known multiplexing schemes such as time-division or frequency-division. If such a multiplexing option is available, information defining the multiplexing scheme is transmitted to the receiver ground station 7 prior to signal transmission, either on a transmission-by-transmission basis, or as a one-time only establishment of a multiplexing scheme for all future transmissions, to enable the receiver processing module 3 to extract the required signals. If such a multiplexing scheme is not available or appropriate, it may be possible to simultaneously transmit a plurality of signals over a respective plurality of routes through the communications constellation 8 in parallel. In this instance, the transmitter processing module 2 operates to select particular transmission routes according to a priority scheme, such that information determined by the processing module 2 to be highest priority is, for example, transmitted over a route having the lowest latency, and information having lower priority may be allocated a different route. The priority may be included by a user in the provision of a signal transmission request to the transmitter processing module 2, or in other cases the transmitter processing module 2 may make its own automatic priority determination based on information such as a flag or keyword, or the presence of a particular data type contained in the information to be transmitted. Signals transmitted over different routes may be transmitted with different transmission schemes, dependent on required levels of encryption for particular content, communications conditions, different frequency channels, and so on, as described above.

In some embodiments, the control of parallel transmissions, for example using a weighting scheme, by the network management module 11 enables signals to be transmitted to multiple receiver ground stations, rather than the single ground station 7 illustrated in FIG. 1. This might be appropriate, for example, when a signal needs to be transmitted from a stock exchange in New York to stock exchanges in both London and Tokyo. In this instance, a plurality of optimum routes can be determined using the same techniques as described above, one for New York to London, and one from New York to Tokyo, for example, although more complex routing will also fall within the scope of the present invention. It will be appreciated that the two routes may overlap, for example in respect of a section of the communications constellation orbiting above the Atlantic Ocean, and that signal transmission may be split on a 50%/50% basis, or other ratio, at a particular transparent or regenerative gateway satellite orbiting above Europe, to a route to the London downlink and to an Asian transmission section to reach the Tokyo downlink. In the case of a regenerative gateway satellite, filtering may also be performed so that only a portion of the signal received by London, for example, is also forwarded to Tokyo, although a multiplexing scheme may enable two independent signals to be transmitted to the two destinations. Alternatively, two entirely distinct transmission routes might be selected requiring information to be transmitted from the processing module 2 of the transmitter PoP 4 to two separate transmitter ground stations over separate terrestrial links. In another embodiment the same data is sent to both receiving stations and the only the relevant data is extracted for that receiver.

In the above embodiments, the processing module 2 at the transmitter PoP 4, having determined one or more optimum routes, supplies routing information, whether routing of an individual signal or routing schemes for multiplexed or parallel signals, to the one or more receiver PoPs 5 in advance of signal transmission between the transmitter ground station 6 and the receiver ground station(s) 7 such that the receiver processing module 3 is able to perform the required demodulation or demultiplexing.

As described above, it is possible to determine an instantaneous configuration of a communications constellation 8 based on information received from the network management module 11, and this might be appropriate for short-duration transmissions where the configuration of the communications constellation 8 is not expected to change significantly during the signal transmission, ensuring that an optimum route retains "optimum" status until the required transmission is completed. It will, however, be appreciated, that certain applications will demand a longer duration transmission, or establishment of a continuous link, and in such cases, the status of a particular route as optimum may not exist only for a portion of the time for which signal transmission is to be performed.

In some embodiments, the processing module 2 communicates with the network management module 11 continuously or periodically, in order to obtain regular updates on the status of the communications constellation 8, so that it is possible to update the optimisation algorithm accordingly. In some embodiments, such updating can be carried out in real-time, leading to real-time switching of the signal transmission route so as to maintain optimum performance.

In other embodiments, the network management module 11 provides the processing module with current location and orbit information, associated with the communications constellation 8, so that the processing module 2 can perform prediction of a communications constellation 8 configuration locally, rather than accessing such information from the network management module 11, although verifications with the network management module 11 can be performed periodically in order to check that the predictions of the processing module 2 are correct. It may be that certain satellites are taken out of service or fail, or are replaced by other satellites, so that the configuration of the communications constellation 8 may change in a manner unknown to the processing module 2 until communication with the network management module 11.

The determination of an optimum signal transmission route may be performed when signal transmission is requested from a transmitter to a receiver, but it is also possible to apply the same principle of the methods of embodiments of the present invention to the identification and establishment of a communications link for signal transmissions scheduled for a time in the future. In this way, the techniques of the present invention can enable the maintenance of a continuous communications link between two or more points, with switching and real-time updating of the communications link enabling the link to adapt to changes in constellation configuration and/or to account for interference sources, varying latency and so on.

Additionally, the determination of an optimum signal transmission route may be performed while a previous communication is already taking place, such that there is no delay in preparing a future link for communication. In such embodiments, the processing module 2 is simultaneously capable of preparing a signal for transmission and performing a routing algorithm.

The embodiments previously described are explained in the context of a constellation of satellites. In alternative embodiments, the satellites may be completely, or partially, replaced by high altitude platforms (HAPs). HAPs are long-duration unmanned aerial vehicles (UAVs) typically operating at an altitude of 20,000 m above the Earth, which is sufficiently high to be above terrestrial weather systems. One example is the Zephyr vehicle developed by Airbus Defence and Space Limited, which is a solar-powered UAV. By being able to fly autonomously for days and exclusively on solar power, Zephyr can provide an affordable wide-area persistent presence, and has a typical transmission range of 300 km.

When used as an asset in the communications constellation 8 of FIG. 1, a HAP is able to be operated in a transparent configuration in the same way as the satellites described above, although as with a satellite, it is possible to operate some HAPs of the communications constellation 8 in a regenerative mode.

A main difference between HAPs and satellites when used in the communications constellation 8 is the altitude at which the HAPs operate. This is typically lower than that of satellites, and so the consequence is that the HAPs are typically suitable for communication over shorter distances, measured as a projection onto the Earth's surface, than satellites, due to the reduced field of view relative to the Earth's surface.

For shorter-range communications, however, the HAP configuration may have enough capability to enable a sufficiently low latency link to be established through free-space inter-HAP communication, and the lower altitude may represent a lower potential overall latency than a link achieved via a satellite link due to the reduced distance required for the uplink and downlink. It is potentially necessary, however, to take into account a greater number of interference sources due to the greater proximity to Earth and other high-altitude communications systems.

As a result of the reduced altitude, the elevation of the HAP may be lower than that of a satellite, and may, for example, be as low as 2°-3°, relative to a ground station, which maximises coverage of a particular transmitter or receiver ground station 6, 7. In addition, the position of a HAP is relatively static, compared with the orbit of a satellite, which stabilises the geometry used as the basis of the optimisation algorithms. Either RF or optical (laser) links, or a combination, could be used.

It will thus be appreciated that there are advantages associated with both HAPs and satellites, and in some embodiments, it is possible to employ hybrid communications constellations which use both HAPs and satellites. This configuration can facilitate the uplink and downlink stages, through using HAPs as a bridge to the higher altitude satellites, but it will be appreciated that in further embodiments, the processing module 2 of the transmitter PoP 4 is able to select between a HAP or a satellite on the transmission route in dependence upon the available, or the required, transmission distance.

It is possible, for example, that a communications constellation 8 to be used might have a relatively small number of satellites and a relatively large number of HAPs, due to the associated cost and complexity associated with establishing the constellation, and without the HAPs, there could be a delay in some circumstances associated with waiting for a satellite to come into range of e.g. the transmitter ground station 6. This situation can be alleviated if there are sufficient satellites in the communications constellation 8, but it is also possible to alleviate this situation through using the HAPs, which might be controlled to have a service area which includes an area above the position of a particular transmitter ground station 6 on Earth, which then relays the signal to a higher orbits. Once in a higher orbit, satellite links can be used for long-distance transmission.

A HAP-based communications constellation 8 for use with embodiments of the present invention comprises three types of HAP payloads; a point-to-point payload with two antennas and inter-HAP links operating according to a bent-pipe architecture, aircraft-to-aircraft payload (analogous to an inter-satellite link), and an aircraft-to-ground link. The payloads perform station keeping through connection to a ground-based network management module 11.

In one implementation, a HAP of each of the three types described above is arranged to fly autonomously at day and night, maintaining the connection between New York City and Chicago. An example of the total path length is 1158 km, compared with the geodesic length of 1132 km between the two cities. The deviation of 26 km from the geodesic path length is potentially less than which can be maintained with a satellite constellation.

HAPs can also be used to replace terrestrial links between the transmitter and receiver PoPs 4, 5 and their respective ground stations 6, 7. This would enable great flexibility and would potentially avoid the cost or complexity of microwave towers. Since the position of a HAP can be controlled by the network management module 11, HAPs can be used to extend the network quickly by moving one or more HAPs when necessary, for example, to ensure that a scheduled communication can be serviced. The avoidance of terrestrial microwave towers would be particularly advantageous where a signal is to be transmitted over complex terrain, since a signal could be transmitted above the terrain, with a shorter path length. In these implementations, the transmitter and receiver PoPs 4, 5 may comprise local transmitter and receiver ground stations 6, 7 which can directly transmit to and receive from a HAP.

In summary, HAP-based systems are cheaper than an all-satellite solution over shorter distances and are also readily upgradeable. Satellites, in contrast, require lower maintenance and operational costs. Both systems allow quick establishment of a connection upon demand (minutes to days) whereas a traditional fibre/microwave tower solution can take years to build.

Figure 2:
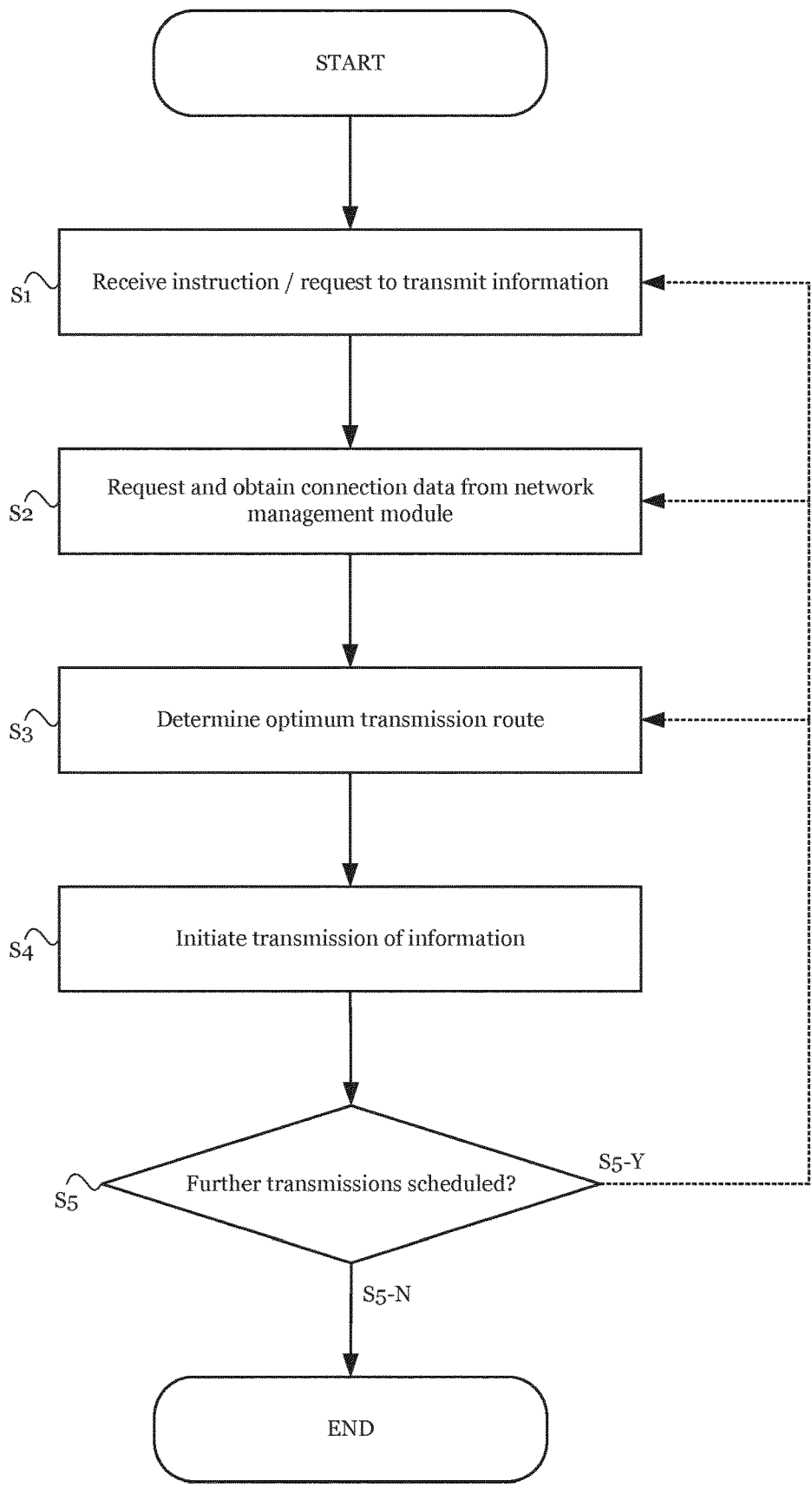
FIG. 2 illustrates a signal routing method according to embodiments of the present invention.

FIG. 2 illustrates a signal routing method according to embodiments of the present invention, as performed by a processing module in a transmitter PoP of the type described above.

In step S1, the processing module receives a request or instruction to transmit information from a transmitter ground station associated with the processing module to one or more receiver ground stations. In addition to containing the information to be transmitted, and its intended destination(s), the request or instruction may also specify particulars of transmission, such as the timing of the transmission, a preferred transmission scheme such as a frequency channel or required quality of service, a required level of security, and a preferred communications constellation through which the information is to be transmitter. If the request or instructions does not contain this information, it may be determined automatically by the processing module.

In step S2, the processing module requests connection data from a network management module associated with the preferred communications constellation, or associated with a communications constellation selected by the management module on the basis of a pre-configured setting. The processing module communicates with the network management module on the basis of by accessing a known uniform resource locator. The requested connection data contains information defining the available connections between assets in the communications constellation at one or more points in time and is downloaded by the processing module from the network management module.

In step S3, the processing module determines a sequence of assets in the communications constellation which represents an optimum route through the communications constellation for transmission of the signal from the transmitter ground station. The optimum route may be determined on the basis described above, and depending on the specific optimisation to be performed, uses one or more of the following information types which can be received in step S2: position of assets in the communications constellation at a fixed point in time, projected motion of assets in the communications constellation, transmission characteristics including meteorological and/or interference information, in addition to information received in step S1.

In step S4, on completion of the optimisation process, the processing module initiates transmission of the requested information to one or more receivers based on transmission particulars received in step S1. The initiation comprises transmission of an appropriate signal containing the requested information, having been processed into a transmission format determined by the processing module, and transmission to a transmitter ground station, from which the transmitter ground station is controlled to transmit the signal to the first asset of the determined sequence of assets on the optimum route identified in S3. In step S4, the receiver is also sent the connection details so that it can prepare itself to receive and extract the relevant signals.

Dependent upon the requirements of the transmission protocol used, successful transmission (including latency measurements) may be confirmed through receipt of an acknowledgement message from the receiver by the processing module. The acknowledgement may be transmitted over the same route as the initial signal, or over an alternative lower-priority route. In response to determining a successful acknowledgement, or in response to an assumption of successful transmission following a predetermined time period elapsing, the processing module to return to any of steps S1, S2 or S3 if further transmissions are scheduled. Further scheduling may represent a new signal transmission to take place at a point in the future, or may represent data associated with the original information to be transmitted, which is to be transmitted at regular intervals rather than in a continuous stream. If no further transmissions are scheduled, the process ends (S5-N). The determination as to whether further transmissions are scheduled is performed in step S5, based on information received in step S1. The options available following a positive determination in step S5 (S5-Y) are shown in dotted lines.

For a return to step S1, the processing module has completed a single transmission operation and is awaiting further instructions for signal transmission.

In the case of a return from step S4 to step S2, the processing module has already received instructions for a scheduled group of transmissions, and is performing an update of the determination of an optimum route, to allow for variations in e.g. latency, constellation configuration, and so on. The determination is performed on newly requested information from the network management module.

In the case of a return from step S4 to step S3, the processing module is performing an update of the determination of the optimum route, but not based on new connectivity information from the network management module, but based information previously received in step S2. Such information may represent a projection of movement of assets in the constellation.

In some embodiments, an additional process may take place between steps S3 and S4, or as part of either step S3 and S4, in which the processing module provides information to the network management module relating to the optimum route. Such information may include one or more of: weighting information, control or switching information to be applied to regenerative assets in the communications constellation according to a particular schedule, or information for forwarding to a receiver station relating to transmission particulars, such as a multiplexing scheme, although in modifications of these embodiments, information to be provided to the receiver station may be provided from the processor without passing through the network management module.

In some embodiments, the processing module is operable to perform multiple instances of the method illustrated in FIG. 2 at the same time. For instance, it is possible to perform the steps of any of steps S1, S2 or S3 while steps S4 or S5 are being performed, so that new links can be configured while a prior signal transmission is taking place.

It will be appreciated that the specific routing algorithm to be performed is dependent on a number of factors including the expected communication distance, the nature of a communications constellation through which the signal is to be transmitted, environmental conditions, existence of conflicting communications constellations, the number of signals to be transmitted, the number of receiver destinations, and the required optimisation parameter, and that the embodiments of the present invention may be adapted to operate accordingly. Compatible features of the above-described embodiments may be combined to arrive at configurations and operating methods falling within the scope of the invention as defined by the claims.

The invention claimed is:

1. A signal routing method, performed by a processing module, for configuring transmission of a signal through a communications constellation comprising a plurality of assets, comprising:
   receiving an instruction to transmit a signal from a transmitter ground station associated with the processing module to a receiver ground station via the communications constellation;
   requesting and obtaining connection data, including information defining environmental constraints and asset location, from a network management module defining the available connections between assets in the communications constellation, wherein the available connections between assets include a plurality of inter-asset links between a respective plurality of assets;
   determining, using the obtained connection data, an optimum route through the communications constellation to enable transmission of the signal from the transmitter ground station to the receiver ground station; and
   transmitting the signal from the processing module to the transmitter ground station for transmission to a first asset in a sequence of assets representing the optimum route;
   wherein types of assets of the communications constellation comprise satellites configured in at least one of a Low Earth Orbit, LEO, or high altitude platforms, HAPs; and
   wherein the number of assets of the sequence operating in the repeater configuration is maximized and the number of assets of the sequence operating in the regenerative configuration is minimized.

2. The signal routing method according to claim 1, further comprising the processing module performing packetizing, framing and modulation operations to prepare the signal for transmission through the communications constellation.

3. The signal routing method according to claim 1, wherein transmitting the signal from the processing module to the transmitter ground station comprises transmission via one or more terrestrial network nodes using microwave transmission.

4. The signal routing method according to claim 1, wherein the information defining environmental constraints and asset location is obtained from at least one of:
   predetermined information defining the configuration of the communications constellation over a predetermined period of time, or
   real-time positions of the assets;
   and the determining of the optimum route is performed in a manner which takes into account variation of the communications constellation configuration with time, such that the optimum route is switched in response to variations in asset positions.

5. The signal routing method according to claim 1, wherein obtaining the connection data comprises obtaining information defining line-of-sight connectivity between assets and signal transmission characteristics existing between assets having line-of-sight connectivity.

6. The signal routing method according to claim 5, wherein the signal transmission characteristics represent at least one of interference or meteorological influences.

7. The signal routing method according to claim 1, wherein the types of assets in the determined sequence of assets in the optimum route are determined in dependence upon the distance between the assets in the sequence.

8. The signal routing method according to claim 1, comprising determining a plurality of optimum routes for transmission of signals associated with a respective plurality of frequency channels.

9. The signal routing method according to claim 1, wherein a HAP is configured for operation at an elevation of 2°-3° above a transmitter ground station and/or a satellite is configured for operation at an elevation of 5° above a transmitter ground station.

10. A telecommunications modem comprising a processing module, the telecommunications modem comprising:
    a signal transmitter for transmitting information to a transmitter ground station; and
    a control link to a network management module;
    wherein the processing module is arranged to execute computer-implementable instructions to control the telecommunications modem to:
      receive an instruction to transmit a signal from a transmitter ground station associated with the processing module to a receiver ground station via the communications constellation;
      request and obtain connection data, including information defining environmental constraints and asset location, from a network management module defining available connections between assets in the communications constellation, wherein the available connections between assets include a plurality of inter-asset links between a respective plurality of assets;
      determine, using the obtained connection data, an optimum route through the communications constellation to enable transmission of the signal from the transmitter ground station to the receiver ground station; and
      transmit the signal from the processing module to the transmitter ground station for transmission to a first asset in a sequence of assets representing the optimum route;
      wherein types of assets of the communications constellation comprise satellites configured in at least one of a Low Earth Orbit, LEO, or high altitude platforms, HAPs; and wherein the number of assets of the sequence operating in the repeater configuration is maximised and the number of assets of the sequence operating in the regenerative configuration is minimized.

* * * * *